Patented Mar. 12, 1935

1,993,803

UNITED STATES PATENT OFFICE 1,993,803

ACCELERATOR COMPOUND AND PROCESS OF PREPARING SAME

Donald H. Powers, Pennsgrove, N. J., assignor to E. I. du Pont de Nemours & Company, Wilmington, Del., a corporation of Delaware No Drawing. Application October 9, 1926, Serial No. 140,692

25 Claims. (Cl. 260—130)

This invention relates to a new class of products and to the process of preparing the same. More specifically, it relates to a class of compounds resulting from the interaction of an aldehyde, a primary amine and carbon disulphide.

The invention has as its primary object the production of novel compounds of valuable characteristics. In particular, it is the object of the invention to produce compounds especially adapted to accelerate the vulcanization of rubber and which will, when employed as accelerators, reduce the time required for satisfactory vulcanization, and yield a rubber product of superior quality and durability.

This application is in the nature of a continuation, in part, of my application Serial No. 34,732, filed June 3, 1925, now Patent 1,732,532 dated October 22, 1929, which covers products resulting from the interaction of an aldehyde, a primary amine, and carbon disulphide and the employment of these products as vulcanization accelerators.

I have now discovered that those aldehydes containing a plurality of carbon atoms are particularly valuable for the manufacture of products of the accelerator type. Also, I have discovered that, if certain ratios of the three components, which ratios were not specifically disclosed in the previous application, are employed, products of very unusual activity as accelerating agents result. Particularly, I have discovered that the use of two, three or four moles of an aldehyde with one mole of amine gives compounds of remarkable activity. The amines and aldehydes used may be either aliphatic or aromatic, although in the preferred embodiments of my invention I employed aliphatic aldehydes. The compounds resulting are of indefinite composition.

The method of manufacturing these new accelerators may be varied. One method of preparing them is to condense the aldehyde with the amine to form a condensation product, with the elimination of water, and to then treat this product with carbon disulphide. By equation, the reaction might be expressed as follows:

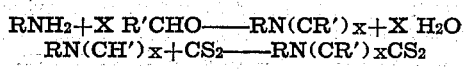

It has also been found that by mixing the amine, CS₂ and aldehyde that a product of similar accelerating activity is obtained.

The preparation of the new accelerators may be best disclosed by the presentation of a number of examples embodying the invention. It is to be understood that these examples are purely illustrative and that the conditions, reagents and proportions therein specified are susceptible of variation. The examples follow:

*Example 1.*—310 lbs. butyraldehyde are slowly added in a closed system to 100 lbs. of aniline in a kettle equipped with a jacket, a coil for heating and cooling, and an agitator. The temperature is kept below 50° C. during addition of butyraldehyde. After the addition is complete the mixture is slowly heated to 120° C. and kept at this temperature for one hour. The water formed is then allowed to separate as a lower layer and drawn off. The product is cooled to 30° C. and 80 lbs. carbon disulphide are added in a closed system using the usual precautions necessary in handling this material. The temperature is raised to 80° C. and held there for one and one-half (1½) hours. At the end of this time the reaction product is cooled to 50° C. and any unreacted volatile matter drawn off by the use of a high vacuum. The remaining oil is drawn off and collected in the usual manner. A product made in the above manner and tested in a pure gum mix in a percentage of 0.375 gave a good cure in thirty (30) minutes at twenty-five (25) lbs. steam pressure. The quantities employed in this example correspond to 4 moles of aldehyde, 1 mole of aniline, and 1 mole of carbon disulphide.

*Example 2.*—285 lbs. heptaldehyde and 180 lbs. butyraldehyde are added slowly to 92 lbs. of aniline. After the addition is complete the mixture is slowly heated to 140° C. and held for one hour. The water formed is then allowed to separate as a lower layer and drawn off. The product is then cooled to 30° C. and 80 lbs. of carbon disulphide are added and the reaction completed as in Example 1. A product made in the above manner and tested in a pure gum mix in a percentage of 0.350 gave a good cure in thirty (30) minutes at twenty-five (25) lbs. steam pressure. The quantities employed in this example correspond to 5 moles of aldehyde, 1 mole of aniline and 1.1 moles of carbon disulphide.

*Example 3.*—930 lbs. butyraldehyde are added to 250 lbs. of cooled 40% aqueous solution of methyl amine. This mixture is heated in a closed system to 110° C. for three hours. The water is drawn off or may be removed by a vacuum distillation. One hundred and thirty pounds of carbon disulphide are added and the reaction is completed as in Example 1. This product using 0.3 parts in a mix containing one hundred parts of pale crepe, three parts of sulphur and three parts of zinc oxide gave a good cure in an hour at twenty-five pounds steam pressure. The quantities employed in this example correspond to 4 moles of aldehyde, 1 mole of amine and 0.53 mole of carbon disulphide.

Example 4.—225 lbs. benzaldehyde are slowly added to 75 lbs. of normal butyl amine. The mixture is heated under pressure for two hours at 150° C. The water is removed by vacuum distillation and 80 lbs. carbon disulphide added. This product is heated to 100° C. under pressure for an hour, cooled and the uncombined carbon disulphide removed under high vacuum. The resulting product tested in a pure gum mix, three percent zinc oxide and three and a half percent sulphur gives a good cure in an hour at 40 lbs. steam pressure when three-quarters of one percent is used. The quantities employed in this example correspond to 2.1 moles of aldehyde, 1 mole of amine and 1 mole of carbon disulphide.

Example 5.—An example of the alternative method of manufacture of accelerator compounds by mixing the amine, and aldehyde all at once follows:

350 lbs. heptaldehyde are mixed with 80 lbs. of carbon bisulphide and to this mixture 110 lbs. of p-toluidine are added slowly. The mixture is then heated slowly to 140° C. and held for one hour. The water formed is then allowed to separate and drawn off. Any unreacted volatile matter is then drawn off under vacuum. The product, made in the above manner, and tested in a pure gum mix in a percentage of 0.325 gave a good cure in 30 minutes at 25 lbs. steam pressure. The quantities employed in this example correspond to 3 moles of aldehyde, 1 mole of amine and 1 mole of carbon disulphide.

Products having similar accelerating activity to those prepared by treating the amine first with the aldehyde and then with $CS_2$, may be prepared in each instance by this alternative method.

While I have mentioned for purposes of illustration definite quantities of the reacting components and certain specific temperatures and times of reaction, and in general have given exact conditions under which my improved compounds may be made, I, of course, do not limit myself to these specific proportions or conditions. These illustrative conditions and methods of effecting the interaction and combination of the ingredients may obviously be varied without departing from my invention. In cases where I use more than one aldehyde I may use other aldehydes than those specified in Example 3, also more than one amine or a mixture of aromatic and aliphatic amines may be used. As little as one half a mole of carbon disulphide for each mole of amine may be employed.

The products of the invention are very high-boiling viscous liquids, dark in color and with a characteristic odor. An increase in the proportion of aldehyde employed increases their accelerating activity. An increase in the proportion of carbon bisulfide also, of course, results in an increase in the accelerating activity due to the greater amount of combined sulfur present. All of the products of the type disclosed in the examples, however, exhibit marked effectiveness as accelerators for the vulcanization of rubber.

The products obtained, as illustrated in the examples, are of indefinite constitution but, as indicated by the equation preceding the examples, contain in combination all of the elements of the respective reagents with the exception of the water eliminated.

In the claims where I specify "a primary aromatic amine", I intend to cover, also, the substituted primary aromatic amines as aniline and its homologues. Where I specify "rubber" I intend to cover all the botanical varieties of caoutchouc, which include hevea, balata, gutta percha, etc. and recognized substitutes therefor.

I claim:

1. A dark, high-boiling, viscous liquid or resinous solid obtained by the chemical combination, in the absence of substantial quantities of added acid, of an aldehyde, a primary aromatic amine, and carbon bisulphide, with the elimination only of water.

2. A product such as covered by claim 1, in which two to four moles of aldehyde are employed to one mole of amine.

3. A product such as covered by claim 1, in which more than 2½ moles of aldehyde are employed to one mole of amine.

4. A dark, high-boiling, viscous liquid or resinous solid obtained by the chemical combination, in the absence of substantial quantities of added acid, of an aliphatic aldehyde containing a plurality of carbon atoms, a primary amine, and carbon bisulphide, with the elimination only of water.

5. A dark, high-boiling, viscous liquid or resinous solid obtained by the chemical combination, in the absence of substantial quantities of added acid, of an aliphatic aldehyde containing a plurality of carbon atoms, a primary aromatic amine, and carbon bisulphide, with the elimination only of water.

6. A dark, high-boiling, viscous liquid or resinous solid obtained by the chemical combination, in the absence of substantial quantities of added acid, of an aliphatic aldehyde containing a plurality of carbon atoms, aniline, and carbon bisulphide, with the elimination only of water.

7. The product set forth in claim 6 in which two to four moles of aldehyde are employed to one mole of amine.

8. A dark, high-boiling viscous liquid obtained by the chemical combination, in the absence of substantial quantities of added acid, of butyraldehyde, aniline, and carbon bisulphide, with the elimination only of water.

9. A dark, high-boiling viscous liquid or resinous solid obtained by causing carbon bisulphide to react on the condensation product of a primary aromatic amine and an aldehyde containing a plurality of carbon atoms, with the elimination only of water.

10. The product set forth in claim 9, in which two to four moles of aldehyde are employed to one mole of amine.

11. A dark, high-boiling viscous liquid or resinous solid obtained by causing carbon bisulphide to react on the condensation product of a primary aromatic amine and butyraldehyde.

12. The product set forth in claim 11 in which two to four moles of aldehyde are employed to one mole of amine, with the elimination only of water.

13. The process of preparing a new compound which comprises interacting, in the absence of substantial quantities of added acid, a primary aromatic amine, an aldehyde and carbon disulphide, with the elimination only of water.

14. The process of preparing a new compound which comprises interacting, in the absence of substantial quantities of added acid, a primary aromatic amine, an aliphatic aldehyde and carbon disulphide, with the elimination only of water.

15. The process of preparing a new compound which comprises interacting, in the absence of substantial quantities of added acid, substantially one mole of a primary amine, more than one mole of an aldehyde and carbon disulphide, with the elimination only of water.

16. The process of preparing a new compound which comprises interacting, in the absence of substantial quantities of added acid, substantially one mole of a primary amine, more than one mole of an aliphatic aldehyde and carbon disulphide, with the elimination only of water.

17. The process of preparing a new compound which comprises interacting, in the absence of substantial quantities of added acid, substantially one mole of a primary aromatic amine, more than one mole of an aliphatic aldehyde and carbon disulphide, with the elimination only of water.

18. The process which comprises causing carbon bisulphide to react on the condensation product of a primary amine and an aldehyde containing a plurality of carbon atoms, with the elimination only of water.

19. The process set forth in claim 18 in which two to four moles of an aldehyde are employed to one mole of amine.

20. The process which comprises causing carbon bisulphide to react on the condensation product of a primary aromatic amine and an aldehyde containing a plurality of carbon atoms, with the elimination only of water.

21. The process which comprises causing carbon bisulphide to react on the condensation product of a primary aromatic amine and an aliphatic aldehyde containing a plurality of carbon atoms, with the elimination only of water.

22. The process set forth in claim 21 in which two to four moles of aldehyde are employed to one mole of amine.

23. The process of preparing a new compound which comprises causing carbon bisulfide to react on a condensation product of aniline and butyraldehyde.

24. The process of preparing an accelerator comprising the reacting of carbon disulphide upon the preformed reaction product of an aliphatic aldehyde and an aromatic primary amine, said aldehyde-amine product being obtained by combining at least one mol of said aldehyde with one mol of an amine.

25. As a new product an accelerator prepared by reacting carbon disulphide upon the preformed reaction product of an aliphatic aldehyde and an aromatic primary amine, said aldehyde-amine product being obtained by combining at least one mol of said aldehyde with one mol of an amine.

DONALD H. POWERS.